(12) United States Patent
Aekbote et al.

(10) Patent No.: US 8,651,517 B1
(45) Date of Patent: Feb. 18, 2014

(54) INFLATION OF SIDE CURTAIN AIR BAG WITH PROTECTION FOR OUT-OF-POSITION HEAD

(71) Applicant: Ford Global Technologies, LLC, Dearborn, MI (US)

(72) Inventors: Krish E. Aekbote, Farmington Hills, MI (US); Marwan A. Elbkaily, Canton, MI (US); Mary A. Mason, Dearborn, MI (US); Chunyu Wang, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/628,122

(22) Filed: Sep. 27, 2012

(51) Int. Cl.
*B60R 21/232* (2011.01)
*B60R 21/26* (2011.01)

(52) U.S. Cl.
USPC .................... 280/730.2; 280/742; 280/729

(58) Field of Classification Search
USPC ............................ 280/730.2, 729, 742, 743.1
See application file for complete search history.

(56) References Cited

U.S. PATENT DOCUMENTS

| | | | |
|---|---|---|---|
| 6,450,527 B2 * | 9/2002 | Kobayashi et al. | 280/729 |
| 6,450,529 B1 | 9/2002 | Kalandek et al. | |
| 6,863,299 B2 | 3/2005 | Schneider et al. | |
| 6,883,826 B2 * | 4/2005 | Fujiwara | 280/730.2 |
| 7,278,655 B2 * | 10/2007 | Inoue et al. | 280/730.2 |
| 7,322,600 B2 * | 1/2008 | Inoue et al. | 280/730.2 |
| 7,712,768 B2 | 5/2010 | Fukuda et al. | |
| 7,731,227 B2 * | 6/2010 | Hotta et al. | 280/730.2 |
| 7,748,734 B2 | 7/2010 | Wilmot | |
| 7,775,553 B2 * | 8/2010 | Takemura et al. | 280/730.2 |
| 7,789,418 B2 * | 9/2010 | Wipasuramonton et al. | 280/730.2 |
| 7,832,760 B2 * | 11/2010 | Mitsuo et al. | 280/730.2 |
| 7,942,444 B2 * | 5/2011 | Steinbach et al. | 280/743.2 |
| 8,033,568 B2 * | 10/2011 | Tanaka et al. | 280/729 |
| 8,485,549 B2 * | 7/2013 | Yamamura et al. | 280/730.2 |
| 2008/0258442 A1 | 10/2008 | Quach et al. | |
| 2008/0309056 A1 * | 12/2008 | Ohba | 280/730.2 |
| 2009/0230659 A1 | 9/2009 | Megiveron et al. | |
| 2012/0098240 A1 * | 4/2012 | Kato et al. | 280/730.2 |

FOREIGN PATENT DOCUMENTS

GB 2452079 A 2/2009

* cited by examiner

*Primary Examiner* — Drew Brown
(74) *Attorney, Agent, or Firm* — Frank A. MacKenzie; MacMillan, Sobanski & Todd, LLC

(57) ABSTRACT

A side curtain air bag system deploys downward during a crash event into a protection zone overlapping an out-of-position head region. An inflator discharges an inflation gas upon the occurrence of the crash event. The system employs an inflatable bag including first, second, and third chambers. The second chamber has a respective deployed position coinciding with the out-of-position head region. The first chamber has a respective deployed position between the B-pillar and the deployed position of the second chamber. The third chamber has a respective deployed position along a lateral edge of the inflatable bag so that the second chamber is disposed between the first and third chambers. The chambers are configured so that the third chamber substantially fills prior to expansion of the second chamber, whereby the inflatable bag substantially completes its downward movement prior to full expansion of the second chamber.

7 Claims, 5 Drawing Sheets

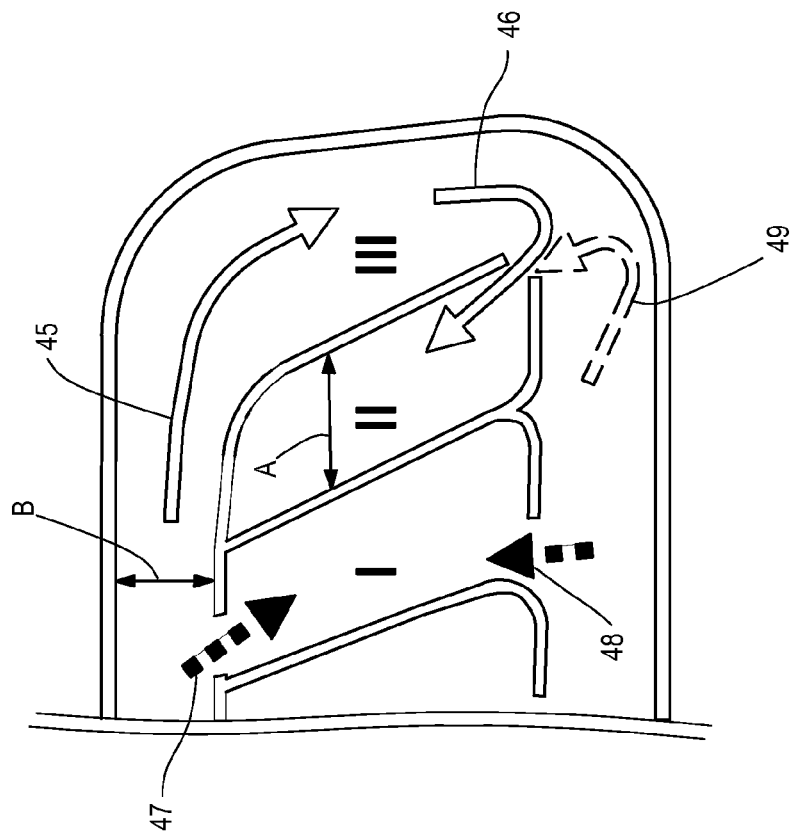
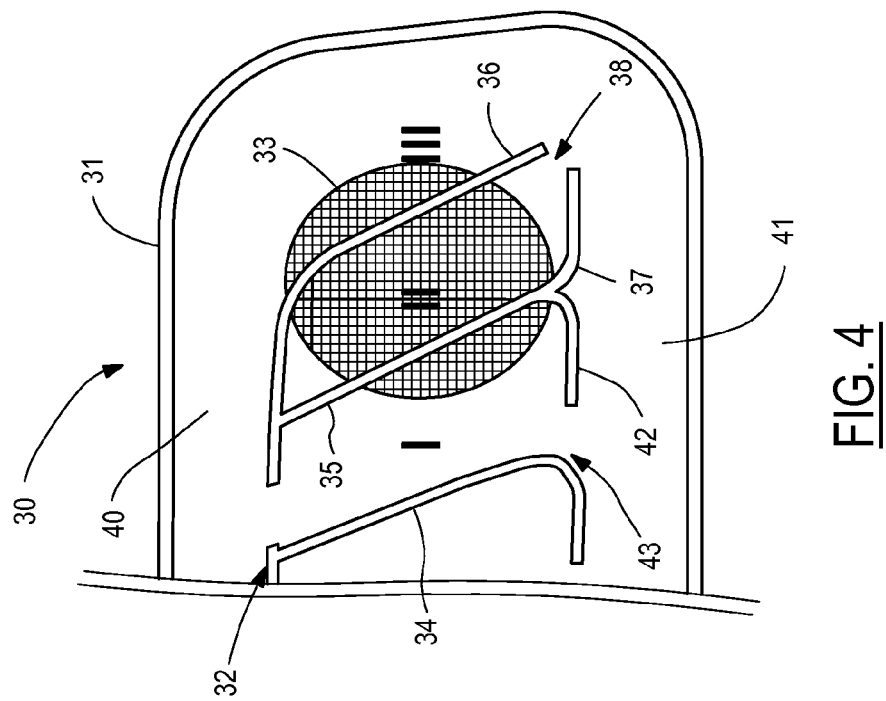

US 8,651,517 B1

INFLATION OF SIDE CURTAIN AIR BAG WITH PROTECTION FOR OUT-OF-POSITION HEAD

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to side curtain air bags for automotive vehicles, and, more specifically, to a staged deployment for protecting an out-of-position occupant.

Side curtain air bags, also known as head air bags, are typically installed in the roof frame and covered by a headliner. Side curtain air bags may start at the A-pillar and extend across all the seat rows. They are deployed inside the side windows in the event of a crash (e.g., a collision or rollover).

A typical known curtain airbag comprises an inflatable bag portion, an inflator for providing the necessary gas supply, and an outer sheath or cover. The bag portion is packed into the frangible cover and located behind a headliner or trim panel. The side curtain airbag is mounted to the roof frame or on other parts of the vehicle.

Upon detection of a crash event, the inflator is activated and inflation gas flows into the inflatable bag. Inflation of the air bag tears open the cover and headliner, allowing the bag to expand downward into a protection zone between an occupant and the side of the vehicle. However, it has been found that if an occupant's head is close to or resting against the side window or side trim of the vehicle (i.e., out-of-position, or OOP) when the airbag deploys, then there may be a tendency for the air bag to wrap a part of itself around the inboard side of the head and to push the OOP head against the window glass.

SUMMARY OF THE INVENTION

In one aspect of the invention, a side curtain air bag system deploys downward during a crash event from a roofline of a vehicle into a protection zone overlapping an out-of-position head region. The vehicle has a B-pillar at a midpoint of the vehicle. An inflator discharges an inflation gas upon the occurrence of the crash event. The system employs an inflatable bag including first, second, and third chambers, wherein the second chamber has a respective deployed position coinciding with the out-of-position head region. The first chamber has a respective deployed position between the B-pillar and the deployed position of the second chamber. The is third chamber has a respective deployed position along a lateral edge of the inflatable bag so that the second chamber is disposed between the first and third chambers. The chambers are configured so that, in response to the discharge of the inflation gas, at least the third chamber substantially fills prior to expansion of the second chamber, whereby the inflatable bag substantially completes its downward movement prior to full expansion of the second chamber.

BRIEF DESCRIPTION OF THE DRAWINGS

FIG. 4 is a side view of a multi-chamber side curtain air bag of the invention showing the relative positions of the chambers with the OOP head.

FIG. 5 is a side view of the air bag of FIG. 4 depicting the flow of inflation gas.

DETAILED DESCRIPTION OF PREFERRED EMBODIMENTS

Figure 1:
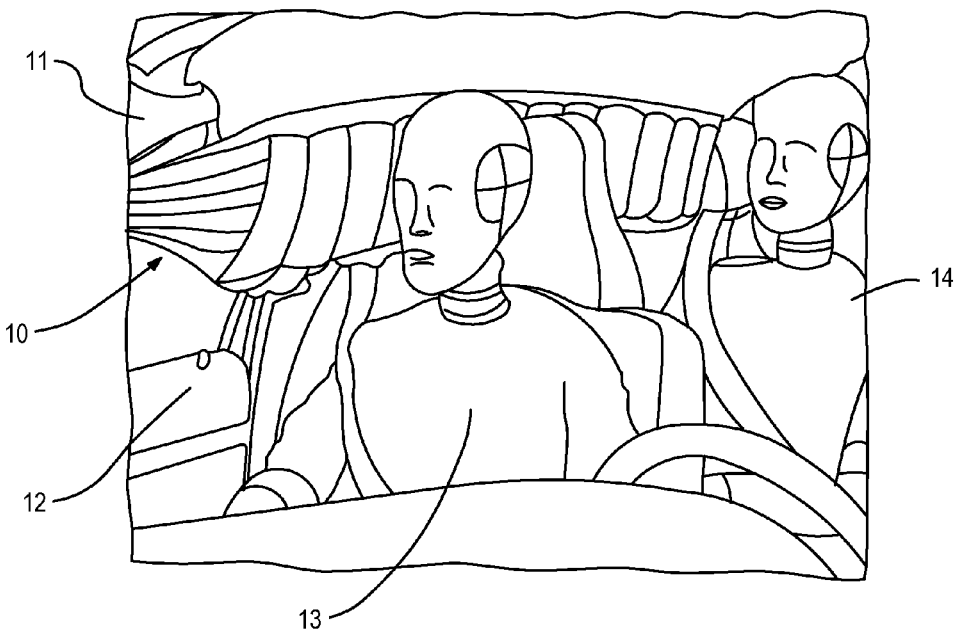
FIG. 1 is an interior view of a vehicle with a side curtain air bag in a deployed state.

Referring to FIG. 1, a side curtain air bag 10 is shown after having been is deployed from a headliner 11. Curtain air bag 10 deploys downward along a vehicle side surface 12 of the passenger cabin in order to protect occupants 13 and 14. Occupants 13 and 14 are shown in their proper position with seatbelts worn. Thus, sufficient space exists for deployment of air bag 10 without the expansion creating an impact between bag 10 and the passengers.

The present invention is applicable to a side air bag curtain installed for any seating row of a vehicle. Particular examples are shown in FIGS. 2-11 for a rear seating row behind a B-pillar of the vehicle, but the same principles apply to a front seating row or any other row.

Figure 2:
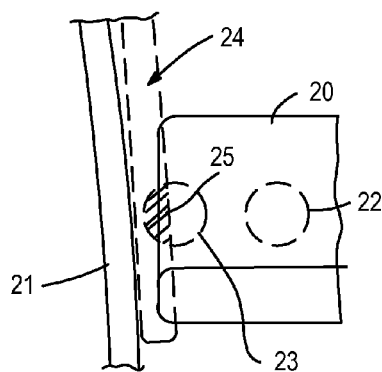
FIG. 2 is a top view showing a passenger seating position in relation to a curtain deployment area and head positions of a passenger.

FIG. 2 shows a passenger seat 20 adjacent a vehicle side surface 21 such as a door or window. A nominal head position 22 is shown corresponding with an occupant being seated upright. An occupant's head may at times be in an out-of-position (OOP) location as shown at 23, e.g. when the occupant rests their head against side surface 21.

A protection zone 24 along side surface 21 is the area into which a side curtain air bag deploys during a crash event. Protection zone 24 overlaps OOP head region 23, creating an intersecting region 25. Due to region 25, care must be taken to ensure that inflation of the side curtain air bag into protection zone 24 does not create a potentially injurious impact with the passenger's head.

Figure 3:
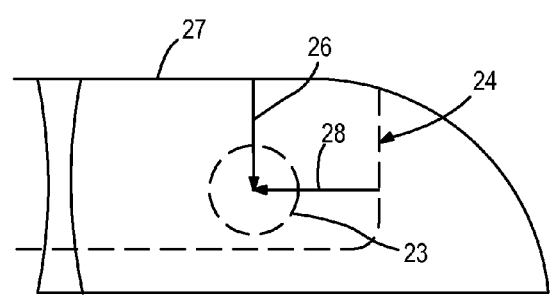
FIG. 3 is a side view showing an out-of-position (OOP) head in relation to a curtain deployment area.

FIG. 3 shows a side view of OOP head position 23 in relation to protection zone 24. OOP head position 23 is spaced downward by a distance 26 from a headliner 27 and forward by a distance 28 from the back edge of zone 24. To meet a static OOP requirement, downward deployment of the side curtain air bag into protection zone 24 should proceed in a manner to avoid causing any injury to a head located in region 23.

The present invention achieves the static OOP requirements by providing an air bag curtain design with multiple chambers such that inflation gas first fills chambers around the OOP head position then backfills the chamber directly contacting the head position. A first embodiment is shown in FIGS. 4 and 5. A portion of an is inflatable bag 30 is formed of conventional material and has an outer edge or seam 31 joining front and back sides of bag 30. A plurality of internal seams 32 join the front and back sides of bag 30 to create a plurality of chambers which are configured to have respective deployed positions coinciding with an OOP head region 33. In particular, a first Chamber I is defined between internal seams 34 and 35 at a respective deployed position that is forward of head region 33. A second Chamber II is defined between internal seam 35 and an internal seam 36 to coincide with the center of head region 33. A third Chamber III lies between seam 36 and outer seam 31 with a deployed position aft of Chamber II and head region 33.

Chamber II has a bottom seam 37. An orifice 38 between seams 36 and 37 fluidically couples Chamber II to Chamber III. A gas passage 40 extends along an upper edge of bag 30 and receives inflation gas from the inflator (not shown). Gas passage 40 transmits the inflation gas to Chamber III at its upper end so that Chamber III immediately receives inflation gas at the onset of a crash event. It will be understood that there may be additional chambers forward of Chamber I, but that any of these additional chambers that are close enough to affect the downward movement in the vicinity of the OOP head region would have their inflation similarly delayed after the inflation of Chamber III.

Orifice 38 is preferably disposed at the lower ends of Chambers II and III and has a size adapted to meter inflation gas from Chamber III to Chamber II at a slow enough rate that Chamber III substantially fills prior to any significant (e.g., no more than 25%) expansion of Chamber II. The filling of Chamber III causes inflatable bag 30 to substantially complete its downward movement into the protection zone between the occupant and the side of the vehicle before expansion of Chamber II. In the preferred embodiment, inflation gas for inflating the second chamber is delivered through the third chamber once the third chamber is substantially filled, thereby ensuring the desired sequence of events. Alternatively, other measures for metering inflation gas into Chamber II may be employed without the inflation gas first passing through Chamber III, provided that no significant expansion occurs in Chamber II until Chamber III is substantially full. For example, a fabric manifold can be constructed having ports that control the amount of gas supplied to each chamber.

Bag 30 includes a lower passage 41 receiving inflation gas from Chamber III, which may also flow past a bottom seam 42 of Chamber I and through an orifice 43 to fill Chamber I. Chamber I may also have an opening to gas passage 40 at its top so that it is filled from the top, if desired. Preferably, Chamber III fills faster than Chamber I so that Chamber III is substantially full before Chamber I is substantially full. Chamber I may be configured to become substantially full before Chamber II is substantially full.

FIG. 5 illustrates the preferred flow of inflation gas, wherein a main flow 45 from the inflator directly fills Chamber III. Once Chamber III is substantially full and has sufficient pressure, a flow 46 passes through orifice 38 to fill Chamber II. When lower chamber 41 receives inflation gas via Chamber I or other chambers nearer the opposite end of bag 30 (not shown), inflation gas can also enter Chamber II along a flow 49. Concurrently, Chamber I is filled via flows 47 and/or 48 to fill more slowly than Chamber III. Depending on the needs of a particular vehicle design, Chamber I may fill faster than Chamber II. Thus, orifice 43 may provide a greater flow than orifice 38.

Arrows A and B indicate widths of passage 40 and Chamber 2, respectively, which are tuned during design of an air bag system in order to properly balance the dynamic performance versus the static OOP performance. As a result of proper tuning, the invention achieves a fast downward deployment time for dynamic test modes (such as IIHS, LINCAP, FMVSS214, and Pole) while minimizing potential injury for OOP cases.

Figure 6:
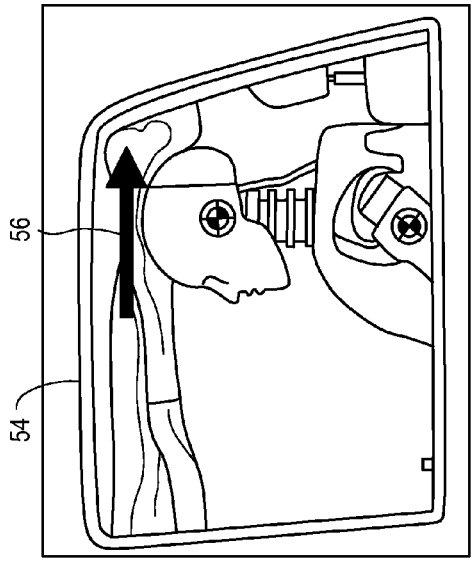
FIGS. 6-11 are side views depicting progressive stages in the deployment of a side curtain air bag according to one embodiment of the invention.
Figure 7:
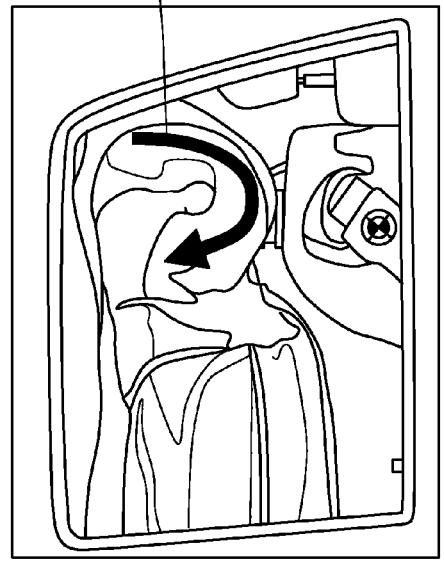

A sequence of events for deploying a side curtain air bag system of the present invention is shown in greater detail in FIGS. 6-11. As shown in FIG. 6, a passenger 50 is seated in a vehicle 51 with their head 52 resting against a side window 53, i.e., an OOP position. An undeployed air bag system is retained behind a headliner 54. When a crash event is detected at a time $t_1$, inflation gas begins to flow along an is upper gas passage and enters the rearmost Chamber III as shown in FIG. 7. As a result of gas flow 56 in FIG. 7, the inflatable bag deploys downward (away from headliner 54).

Figure 8:
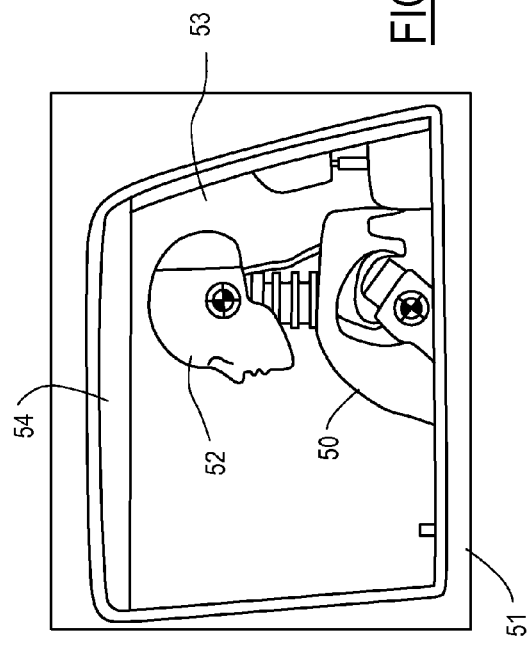

FIG. 8 shows a subsequent time $t_2$ after which rearmost Chamber III has substantially filled and the back end of the inflatable bag has completed its downward movement as shown by arrow 57. An uninflated section 58 of the inflation bag has not yet expanded but has been pulled downward between head 52 and side window 53.

Figure 9:
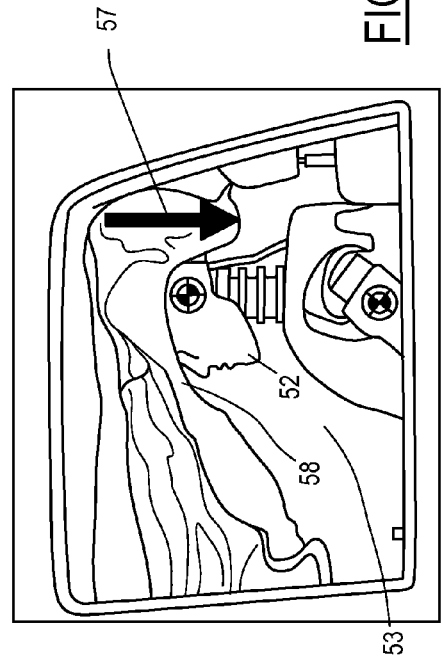
Figure 11:
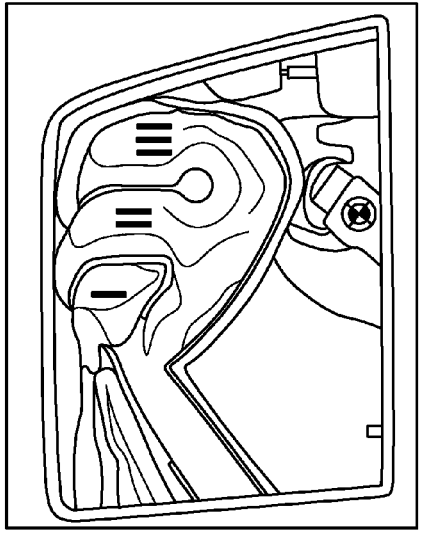
Figure 10:
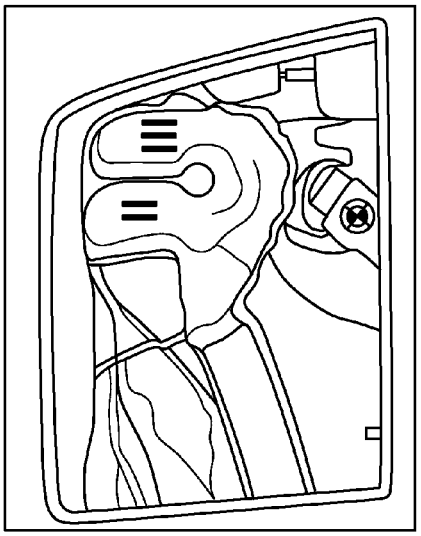

FIG. 9 shows a subsequent time $t_3$ wherein a gas flow 60 goes through the lower gas passage and begins to fill the head contact Chamber II. At a time $t_4$ shown in FIG. 10, Chamber II is substantially full and a forward Chamber I is filling. At a subsequent time $t_5$ shown in FIG. 11, all the chambers have been filled with inflation gas and both an out-of-position passenger and a passenger in a nominal position would be protected.

Figure 12:
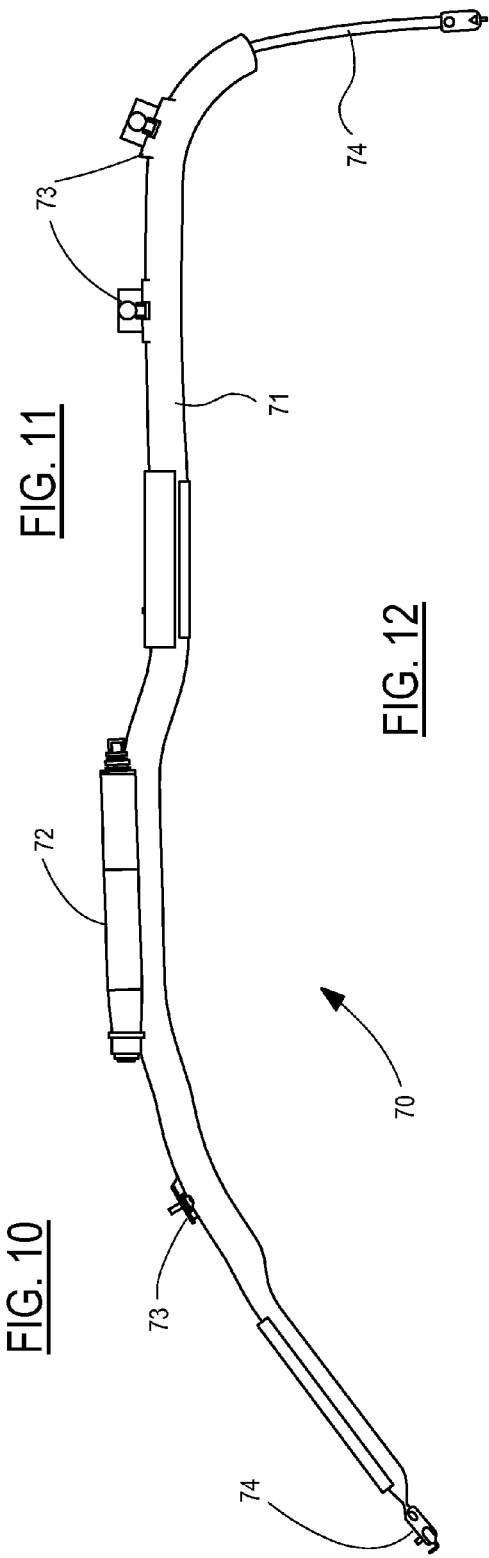
FIG. 12 is a side view of a pre-deployment side curtain air bag system for installing in a headliner of a vehicle.

FIG. 12 depicts a side curtain air bag system 70 having a main housing or tube 71 with an inflator 72 mounted thereon. Housing 71 may be a soft-pack cover with mounting brackets 73 and tethers 74 for mounting system 70 as is known in the art.

Figure 13:
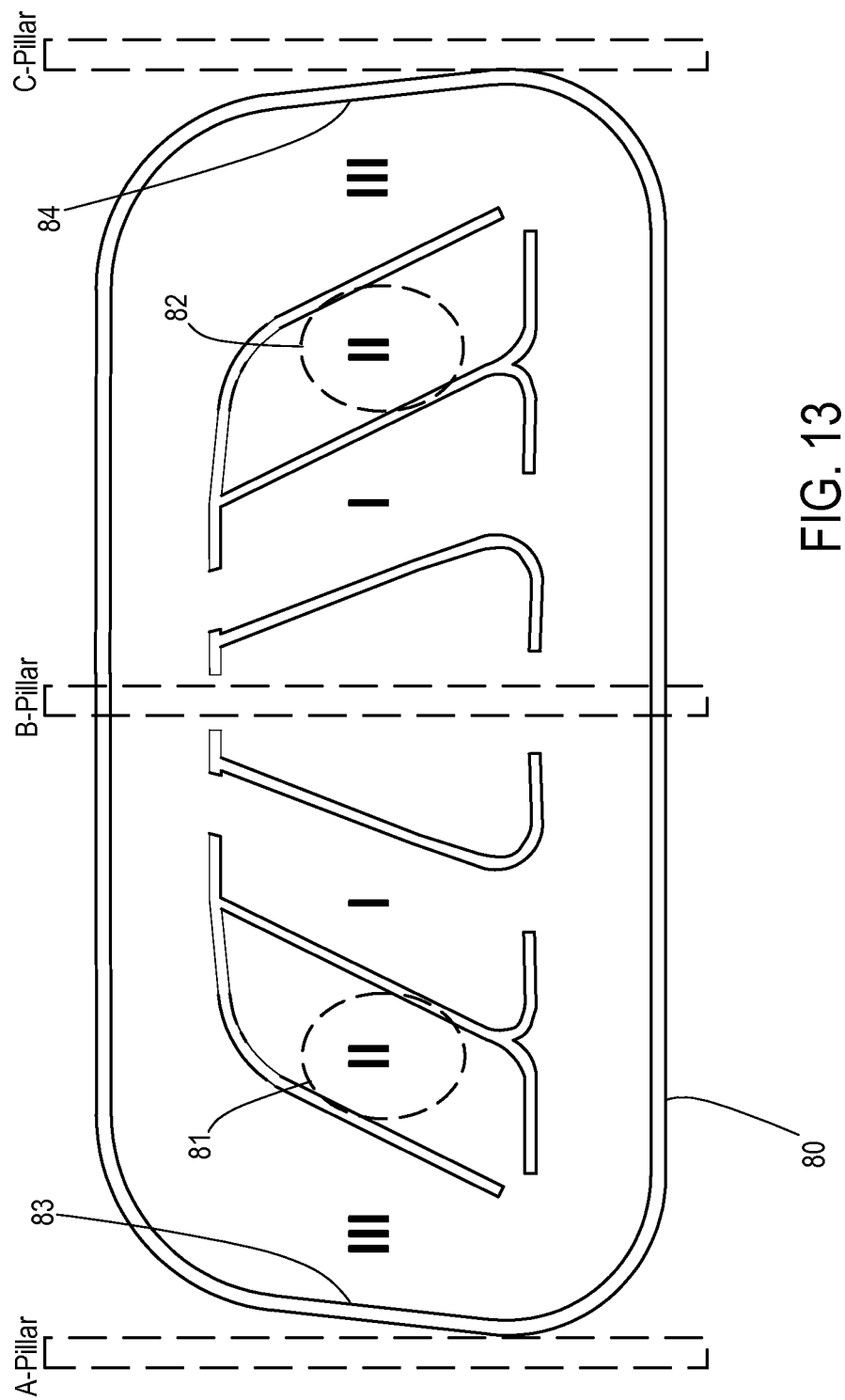
FIG. 13 is a side view of side curtain air bag with sections for front seat and rear seat passengers.

The present invention provides protection for an OOP head for seating rows corresponding to the either the front or rear ends of the side curtain air bag as shown in FIG. 13 which is a side view corresponding to a side curtain air bag 80 in an unfolded, deployed condition. Bag 80 is shown in a position relative to a vehicle's front A-pillar, center B-pillar, and rear C-pillar. A front row OOP head location 81 and a rear row OOP head location 82 coincide with a pair of Chambers II. At the forward lateral edge 83 and rearward lateral edge 84, a pair of Chambers III are formed. A pair of Chambers I are disposed between Chambers II and the B-pillar, respectively. By causing Chambers III to fill prior to Chambers II, lateral edges 83 and 84 are extended downward before any significant expansion of bag 80 at locations 81 or 82.

What is claimed is:

1. A side curtain air bag system for deploying downward during a crash event from a roofline of a vehicle into a protection zone overlapping an out-of-position head region, wherein the vehicle has a B-pillar at a midpoint of the vehicle, the system comprising:

an inflator for discharging an inflation gas upon the occurrence of the crash event; and an inflatable bag including first, second, and third chambers, wherein the second chamber has a respective deployed position coinciding with the out-of-position head region, wherein the first chamber has a respective deployed position between the B-pillar and the deployed position of the second chamber, wherein the third chamber has a respective deployed position along a lateral edge of the inflatable bag so that the second chamber is disposed between the first and third chambers, wherein the inflatable bag includes a gas passage extending along an upper edge for receiving the inflation gas from the inflator, wherein the gas passage is fluidically coupled to the third chamber at an upper end of the third chamber and to the first chamber at an upper end of the first chamber, wherein the first chamber is configured to inflate at a rate slower than a rate at which the third chamber inflates so that the third chamber is substantially full before the first chamber is substantially full, and wherein the chambers are configured so that, in response to the discharge of the inflation gas, at least the third chamber substantially fills prior to expansion of the second chamber, whereby the inflatable bag substantially completes its downward movement prior to full expansion of the second chamber.

2. The system of claim 1 wherein the first chamber is configured to become substantially full before the second chamber is substantially full.

3. The system of claim 1 wherein the inflatable bag includes an orifice fluidically coupling the second chamber to the third chamber so that the second chamber inflates with inflation gas delivered through the third chamber after the third chamber is substantially filled.

4. The system of claim 3 wherein the orifice is disposed at lower ends of the second and third chambers.

5. A method for deploying a side curtain air bag system downward during a crash event from a roofline of a vehicle into a protection zone overlapping an out-of-position head region, wherein the vehicle has a B-pillar at a midpoint of the vehicle, wherein the side curtain air bag system includes an inflatable bag having first, second, and third chambers, wherein the second chamber has a respective deployed position coinciding with the out-of-position head region, wherein the first chamber has a respective deployed position between the B-pillar and the deployed position of the second chamber, wherein the third chamber has a respective deployed position along a lateral edge of the inflatable bag so that the second chamber is disposed between the first and third chambers, the method comprising the steps of:

discharging an inflation gas from an inflator upon the occurrence of the crash event;

inflating a gas passage extending along an upper edge of the air bag system, wherein the gas passage is fluidically coupled to the third chamber at an upper end of the third chamber and to the first chamber at an upper end of the first chamber;

substantially filling the third chamber so that the inflatable bag substantially completes its downward movement prior to full expansion of the second chamber;

inflating the first chamber at a rate slower than a rate at which the third chamber inflates so that the third chamber is substantially full before the first chamber is substantially full;

inflating the second chamber after the third chamber is substantially full.

6. The method of claim 5 wherein the first chamber is configured to fill before the second chamber is substantially full.

7. The method of claim 5 wherein the inflatable bag includes an orifice fluidically coupling the second chamber to the third chamber so that the second chamber inflates with inflation gas delivered through the third chamber after the third chamber is substantially filled.

* * * * *